Dec. 23, 1941.　　　P. M. THOMAS　　　2,266,939
AIRPLANE OXYGEN SYSTEM
Filed Sept. 22, 1939　　　2 Sheets-Sheet 1

INVENTOR
Perry M. Thomas
BY
ATTORNEY

Dec. 23, 1941. P. M. THOMAS 2,266,939
AIRPLANE OXYGEN SYSTEM
Filed Sept. 22, 1939 2 Sheets-Sheet 2
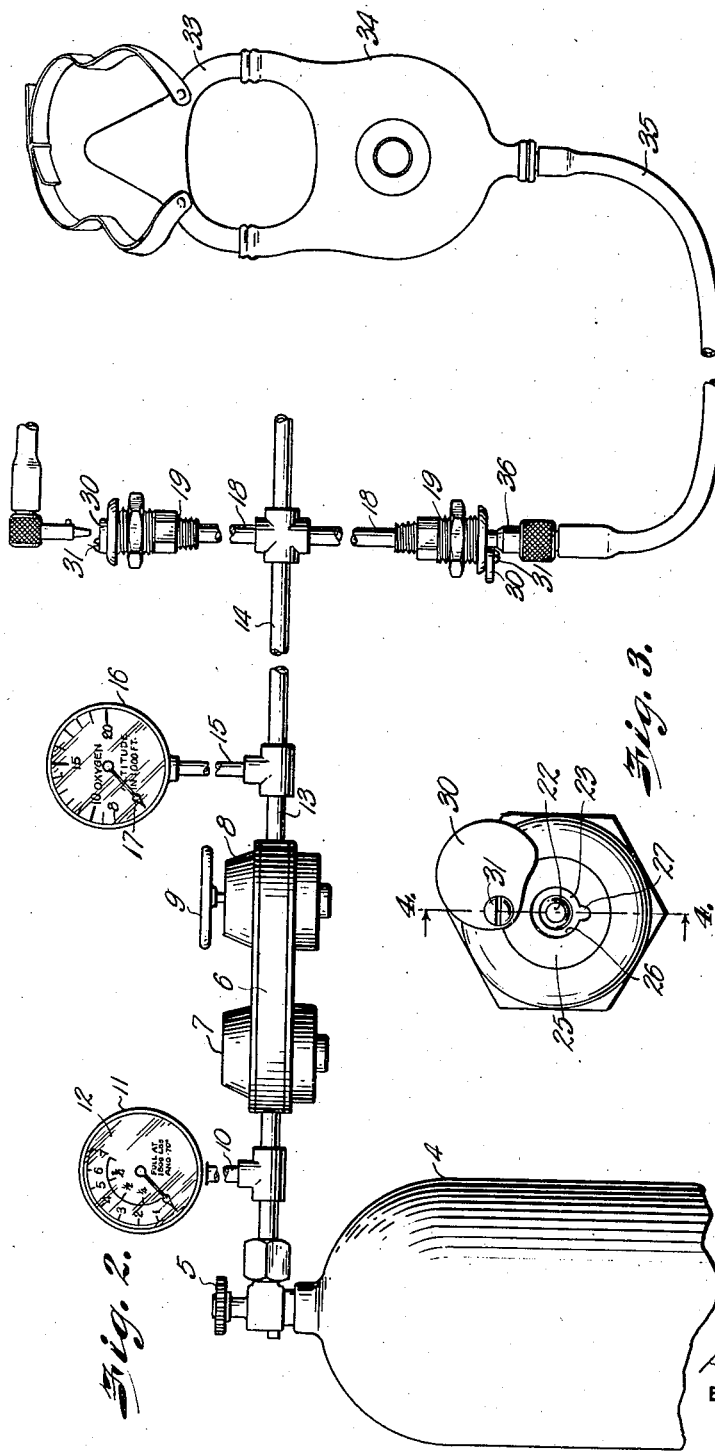
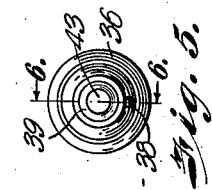
INVENTOR
Perry M. Thomas
BY
ATTORNEY Patented Dec. 23, 1941

2,266,939

UNITED STATES PATENT OFFICE 2,266,939

AIRPLANE OXYGEN SYSTEM

Perry M. Thomas, Elgin, Ill., assignor to Puritan Compressed Gas Corporation, Kansas City, Mo., a corporation of Missouri Application September 22, 1939, Serial No. 296,097

4 Claims. (Cl. 128—202)

My invention relates to an airplane oxygen system, and more particularly to an improved system for furnishing the pilot, co-pilot and passengers of airplane transports with suitable oxygen mixtures for use during high altitude flights.

It frequently becomes necessary for passenger airplanes to fly at high altitudes to avoid weather disturbances and to fly over obstructions. At high altitudes the atmosphere is so rare that a pilot is apt to experience dizziness or lack of coordination, or both, which makes high altitude flying dangerous, and in many cases impossible. It has been found that if the pilot is supplied with oxygen, he is able to keep his faculties and operate the plane with ease and safety.

Passengers likewise in high altitudes must be furnished with an oxygen supply to avoid nausea, dizziness and at times loss of consciousness.

The drawbacks of high altitude flying have made it necessary to pilot planes through mountain passes rather than flying to sufficient altitudes to enable the mountains to be crossed in safety.

The danger of a derangement in the radio direction beam and the liability of a reduction in visibility due to weather conditions arising after a flight has begun, makes the practice of flying through mountain passes a dangerous one and frequently serious accidents have occurred.

It will be clear that if the airplane can fly at sufficiently high altitudes to clear the highest obstruction encountered, mountains may be crossed with safety.

Heretofore oxygen bottles have been carried by airplanes in which the pilot is furnished oxygen by means of a tube which he inserts in his mouth. Breathing masks have been furnished connected to individual oxygen bottles. The desired amount of oxygen necessarily varies directly as a function of the altitude, and in the devices of the prior art no systematic arrangement for the control of the oxygen supply or its distribution have been provided.

One object of my invention is to provide a novel system for the distribution of oxygen to the pilot, co-pilot and passengers of an airplane.

Another object of my invention is to provide a central source of oxygen which can be controlled by the pilot to its correct supply for the particular altitude being navigated.

A further object of my invention is to provide a simple and expeditious manner for distributing oxygen to the various passengers in an airplane.

A still further object of my invention is to provide a novel valve and a readily detachable plug-in means for the distribution of oxygen to a predetermined location.

Other and further objects of my invention will appear from the following description.

In the accompanying drawings which form part of the instant specification and which are to be read in conjunction therewith, and in which like reference numerals are used to indicate like parts in the various views:

Fig. 2 is a schematic view showing the details of my system.

Fig. 3 is a front elevation of a valve of my invention employed in my system.

Fig. 4 is a sectional view taken on the line 4—4, Fig. 3.

Fig. 5 is an end view of the terminal means of an oxygen connection adapted to cooperate with the valve of my invention.

Fig. 6 is a sectional view taken on the line 6—6, Fig. 5.

Figure 1:
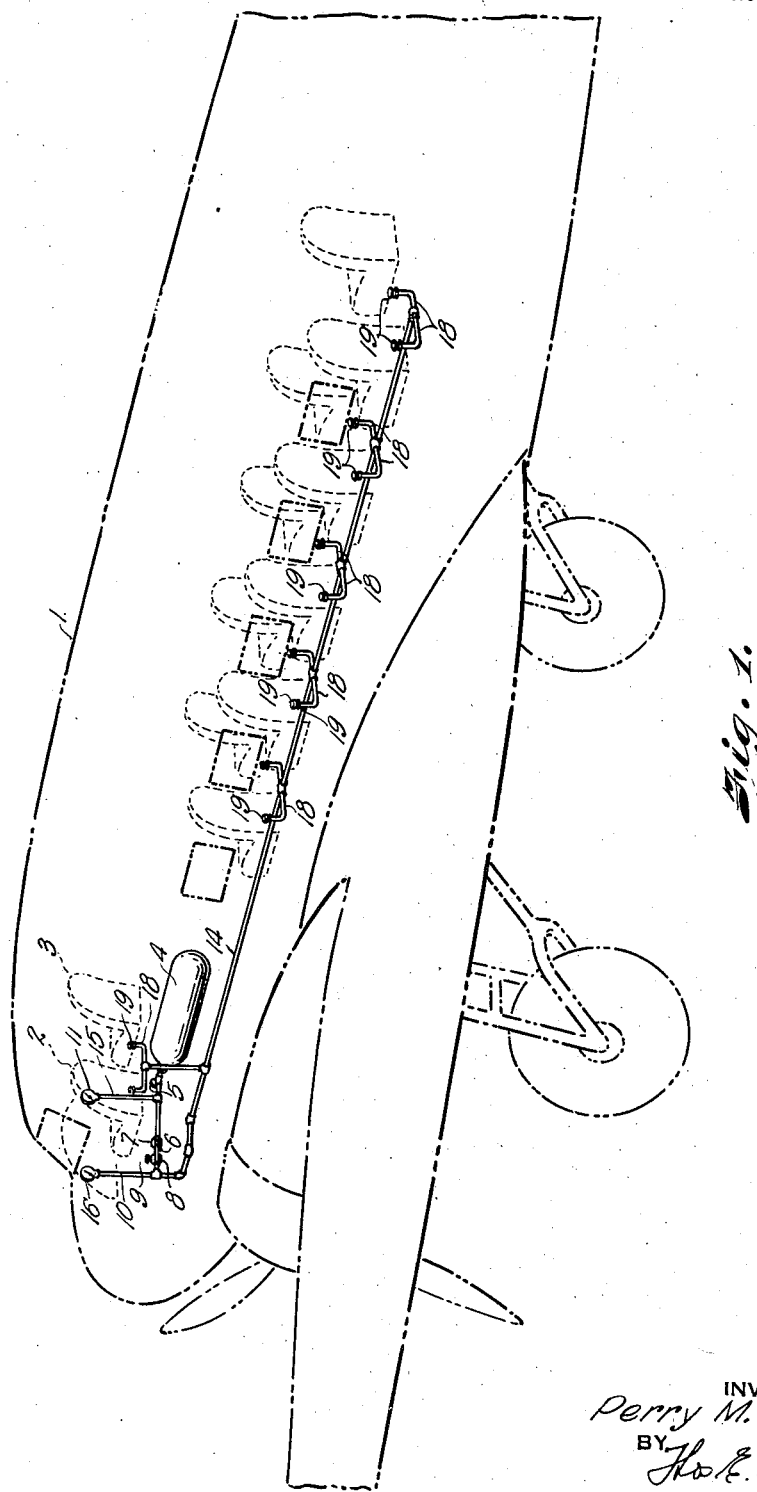
Fig. 1 is a perspective view showing my system in an airplane.

In general, my invention contemplates the provision of a central source of oxygen and control means readily accessible to the pilot for reducing the pressure of the oxygen to that required at the particular altitude being navigated. The oxygen at the predetermined pressure is fed into a manifold provided with a number of branches each terminating in a valve normally seated and situated at a desired position, as, for example, the pilot's seat and the passenger seats. A suitable breathing mask is provided with a flexible oxygen conduit which terminates in a connection adapted to cooperate with the valve to supply oxygen at the desired pressure from the manifold to the user.

More particularly, referring now to the drawings, the airplane 1 may be of any suitable type and is provided with a seat 2 for the pilot and a seat 3 for the co-pilot. An oxygen bottle 4 is provided with a valve 5 and contains a supply of oxygen under pressure. A reducing valve 6 has a first portion 7 and a second portion 8. The portion 8 of the reducing valve is provided with a handle 9 adapted to control the pressure to which the compressed oxygen is reduced. It is understood, of course, that any suitable gaseous mixture, as for example a mixture of oxygen and helium, may be used. The pressure within the oxygen bottle 4 is adapted to be communicated through pipe 10 to a gauge 11 which is calibrated in hours of supply at full capacity. As shown the oxygen bottle 4 is of such capacity as to supply seven hours of oxygen at full load at the highest altitude. The fractional figures on the gauge face 12 indicate the degree of fullness of the oxygen supply with respect to unity, unity being considered as 100% supply.

The oxygen reduced in pressure leaves the reducing valve 8 through pipe 13 and passes into a manifold 14. A pipe 15 provides communication between the manifold and a gauge 16. The gauge 16 is calibrated in altitude in thousands of feet. In other words, the pressure of oxygen for an altitude of 15,000 feet is first determined, and instead of the gauge 16 being calibrated in pressure it is calibrated in altitude. In this manner the pilot may readily adjust the pressure of the oxygen in the manifold 14 by the manipulation of valve handle 9 by simply consulting his altitude gauge and assuring that the pressure in the manifold as indicated by pointer 17 is at the corresponding altitude.

A plurality of pipes 18 communicate with the manifold 14 and terminate in a valve assembly positioned at each point of use. The valve comprises a body 19 which may be made of duraluminum or the like. An orifice plug 20 provided with an orifice 21 is positioned within the body 19. The orifice is such that for the pressure in the manifold 14 a proper supply of oxygen will be furnished to each user. In other words, the arrangement is such that the pressure in the manifold 14 and the orifice 21 are correlated to supply substantially a metered amount of oxygen which is necessary for the particular altitude being navigated.

It will be understood by those skilled in the art that for a given shape and size of orifice the amount of oxygen which will flow will be a direct function of the pressure causing the flow.

A valve 22 is positioned within the valve body and is normally urged to its seat 23 by means of a spring 24, as can be readily seen by reference to Fig. 4. The valve seat may be made of a non-metallic material in order to insure a gas tight joint. The front of the valve body is bored for the reception of an orificed plug 25. The opening 26 is provided with a cutaway portion 27. The plug 25 is likewise provided with a recessed portion 28 having an internal shoulder 29. A cover 30 is pivotally mounted upon a screw 31 and is normally urged to closed position by a spring 32. The oxygen is distributed to a user through a breathing mask 33 fitted with a breathing bag 34, to which the oxygen is supplied through a flexible member 35. The flexible member terminates in a plug-in fitting 36. The portion 37 of the fitting is substantially of the same diameter as the opening 26. A pin 38 is adapted to be aligned with the cutaway portion 27. The tapered portion 39 of the plug is adapted to seat against the periphery 40 of the valve seat 23. The length of the tapered portion 39 is such that when the plug is rotated after insertion and the pin 38 is seated upon the surface 29 of the recessed portion 28, the valve 22 will be lifted from its seat and at the same time the tapered portion 39 will be seated against the edge 40 of the seat 23. The tapered portion 39 is provided with a duct 41 having a side opening 42. The end 43 of the tapered portion is adapted to contact the valve 22 to lift it from its seat and it is necessary to have a side opening 42 so as not to obstruct the passage of oxygen into the chamber 44 of the fitting 36 for passage to the tube 35.

In use, when any of the passengers or pilot desires oxygen, he simply plugs in the breathing mask assembly by means of the plug-in fitting 36, inserting the plug by aligning the pin 38 with the groove 27, pushing the fitting in and then rotating it. The pin seating upon the surface 29 will hold the plug in place, the tapered portion forming a seal against the portion 40 of the valve seat. The end of the plug 43 will lift the valve 22 from its seat and provide communication between the manifold 14 and the breathing device. The breathing device is then put in place and the passenger is furnished with the correct metered amount of oxygen for the altitude of flight. The pilot, of course, will keep the pressure adjusted to the correct amount by aid of the altitude calibrated pressure gauge 16. The pressure gauge 11 will keep the pilot informed of the supply of oxygen.

It will be seen that I have accomplished the objects of my invention. I have provided a novel system of distributing oxygen to the passengers and pilot of an airplane. My system enables high altitude flying to be accomplished in a safe and expeditious manner. Planes may fly to high altitudes to avoid adverse weather conditions and to avoid obstructions with perfect safety. For example, if a plane flying through a mountain pass encounters bad visibility, or the direction beam is such that the pilot has cause to question it, he may fly to a safe high altitude to pass the obstruction in safety without inconvenience or danger to the passengers.

If a particular passenger is more susceptible to the effects of high altitude, he may at any time upon the feeling of discomfort plug in his oxygen mask.

It is understood, of course, that the oxygen bottle may be of any desired capacity, having due consideration for weight, the one shown for a seven hour supply being given for purposes of illustration and not by way of limitation.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. In an airplane, a fuselage, a container for oxygen under pressure, a manifold in said fuselage, a reducing valve, means for providing communication between said container and said reducing valve, means for providing communication between said reducing valve and said manifold, a plurality of branch ducts having communication with said manifold at spaced points therealong, terminal members for said branch ducts, valve seats within said terminal members, valves within said terminal members normally seated on said valve seats, orificed plugs within said terminal members, an inhaler, a flexible tube communicating with said inhaler, a connecting member communicating with said tube, means for connecting said connecting member to one of said terminal members, said connecting member being provided with means for engaging said valve and holding it off its seat to provide communication between a branch duct and said inhaler.

2. In an airplane, a fuselage, a container for oxygen under pressure, a manifold in said fuselage, a reducing valve, means for providing communication between said container and said reducing valve, means for providing communication between said reducing valve and said manifold, a branch duct having communication with said manifold, a terminal member for said branch duct, a valve seat in said terminal member, a valve within said terminal member normally seated on said valve seat, a spring for urging said valve to its seat, an inhaler, a flexible tube communicating with said inhaler, a connecting member communicating with said tube, means for connecting said connecting member to said terminal member, said connecting member being provided with means for engaging said valve and holding it off its seat to provide communication between said branch duct and said inhaler, a seat in said terminal member, and means upon said connecting member for seating on said seat when it is in connected position.

3. In an airplane, a fuselage, a container for oxygen under pressure, a manifold in said fuselage, a reducing valve, means for providing communication between said container and said reducing valve, means for providing communication between said reducing valve and said manifold, a branch duct having communication with said manifold, a terminal member for said branch duct, a valve seat in said terminal member, a valve within said terminal member normally seated on said valve seat, a spring for urging said valve to its seat, an inhaler, a flexible tube communicating with said inhaler, a connecting member communicating with said tube, means for connecting said connecting member to said terminal member, said connecting member being provided with means for engaging said valve and holding it off its seat to provide communication between said branch duct and said inhaler, a seat in said terminal member, and means upon said connecting member for seating on said seat when it is in connected position, a pressure gauge calibrated in altitude, means for providing communication between said manifold and said gauge, means for adjusting said reducing valve, an orificed plug in said terminal member for controlling the flow of oxygen through said branch duct, the construction being such that at the pressure of a predetermined altitude said orificed plug will permit the flow of a predetermined proper amount of oxygen to said inhaler.

4. In an airplane, a fuselage, a container for oxygen under pressure, a manifold in said fuselage, a reducing valve, means for providing communication between said container and said reducing valve, means for providing communication between said reducing valve and said manifold, a branch duct having communication with said manifold, a terminal member for said branch duct, a valve seat in said terminal member, a valve within said terminal member normally seated on said valve seat, a spring for urging said valve to its seat, an inhaler, a flexible tube communicating with said inhaler, a connecting member communicating with said tube, means for connecting said connecting member to said terminal member, said connecting member being provided with means for engaging said valve and holding it off its seat to provide communication between said branch duct and said inhaler, a seat in said terminal member, and means upon said connecting member for seating on said seat when it is in connected position, a pressure gauge calibrated in hours, means for providing communication between said container and said pressure gauge, a second pressure gauge calibrated in altitude, means for providing communication between said second pressure gauge and said manifold, and an orificed plug in said terminal member, the construction being such that for a predetermined pressure corresponding to a given altitude the orificed plug will permit the flow of oxygen to the inhaler at a predetermined proper rate.

PERRY M. THOMAS.